United States Patent Office 3,446,852
Patented May 27, 1969

3,446,852
MESOMERIC PHOSPHONIUM SALTS
Gail H. Birum, Kirkwood, Mo., assignor to Monsanto Company, St. Louis, Mo., a corporation of Delaware
No Drawing. Filed Mar. 30, 1966, Ser. No. 538,588
Int. Cl. C07f 9/28, 9/54
U.S. Cl. 260—606.5      19 Claims

ABSTRACT OF THE DISCLOSURE

Mesomeric diphosphonium salts, $[(Aryl_3P)_2CSG]_aZ^v$ where G is alkyl or aryl and where the alkyl may be substituted by halogen and phenyl by halogen and/or nitro, Z is an anion with valence $v$, and $a$ is equal to $v$; and the method of preparing the same, e.g., by reacting a phosphorane such as hexaphenylcarbodiphosphorane with an appropriate organosulfenyl halide to give compounds where Z is halogen and which can be reacted with other salts to convert Z to another anion. The products are pest control agents, textile auxiliaries, petroleum additives, flame-proofers and ion-exchangers.

---

The novel sulfur-containing mesomeric phosphonium salts of this invention can be represented by the structure

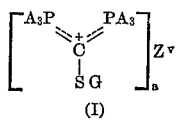

(I)

wherein each A is aryl, G is an organic radical selected from the group consisting of $(R)X_n$, wherein R is alkyl having from 1 to 20 carbon atoms, X is halogen (Cl, Br, I and F) and $n$ is an integer from 0 to 5, and

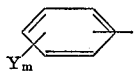

wherein Y is selected from the group consisting of halogen (Cl, Br, F and I) and $NO_2$ and $m$ is an integer from 0 to 3; Z is an anion, $v$ is the actual valence of the anion Z and is an integer from 1 to 2 and $a$ is an integer equal to $v$.

The novel phosphorus salts of Formula I, being mesomeric, can be represented by the formulae:

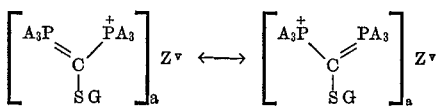

or they can be written to show the equivalence of the two phosphorus atoms as in Formula I above.

For the sake of brevity and simplicity the salts of Formula I above are sometimes represented hereinafter by the formula $[(PA)_3CSG]_a{}^+Z^v$.

The sulfur-containing mesomeric diphosphonium salts of Formula I vary from solids to viscous liquids, depending upon the nature of the R substituent and also on the specific anion. They are essentially insoluble in ethers such as diglyme and in alkyl and aryl hydrocarbons such as benzene, chlorobenzene, toluene, xylene, hexane, cyclohexane and the like, and are generally soluble in lower aliphatic alcohols such as methyl alcohol, ethyl alcohol, propyl alcohol, isopropyl alcohol and in methylene chloride, chloroform and acetonitrile.

A subclass of mesomeric phosphonium salts of this invention, preferred because they are prepared in one step and hereinafter referred to therefore as primary products, are compounds represented by Formula I in which Z is selected from the group consisting of Cl and Br. These primary products can be represented by the formula

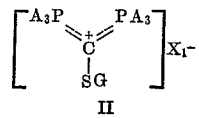

II in which A and G are as defined above, and $X_1$ is selected from the group consisting of Cl and Br.

The primary products of this invention are prepared by the process which comprises reacting hexaphenylcarbodiphosphorane with a sulfenyl halide of the formula $GSX_1$, wherein G and $X_1$ are as defined above, in the presence of an inert organic medium which can be either solvent or suspending agent for either or both of the reactants.

The reaction of the primary process of this invention can be summarized according to the following general equation.

(A)  $A_3P{=}C{=}PA_3 + GSX_1 \longrightarrow$ 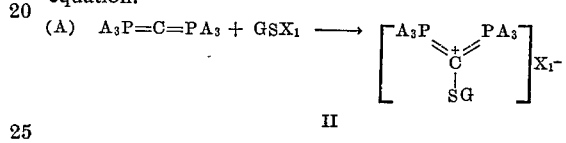

II

In carrying out the primary reaction of this invention the hexaphenylcarbodiphosphorane and sulfenyl halide can be added separately or concomitantly to the reaction vessel in equimolar amounts or an excess of either reactant can be used. Temperature of reaction for process step (A) is not critical and good results can generally be obtained from about 0° C. to 150° C. Temperatures from 20° C. to 100° C. are preferred.

The organic medium employed in process step (A) can be any of the well-known solvents and diluents which are inert to the reactants, e.g. aromatic hydrocarbons such as benzene, toluene, and xylene; ethers such as diethyl ether, dibutyl ether, diglyme and tetrahydrofuran; and cyclic hydrocarbons such as cyclohexane. The preferred media are the ethers in view of the ease of their removal from the products.

The separation of the desired phosphorus compounds from the reaction mixture is readily accomplished by conventional means well known in the art, e.g., filtration, fractional distillation under reduced pressure, selective extraction, fractional distillation using a carrier gas, film distillation, elution or any suitable combination of these methods.

Representative G organic radicals for the compounds of the above formulae prepared by the process of this invention include by way of example alkyl such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl and the various homologues and isomers of alkyl having from 1 to 20 carbon atoms; haloalkyl such as chloromethyl, chloroethyl, trichloromethyl, tribromoethyl, 2,2-dichloropropyl, 1,4-difluorobutyl, 1,1,3,3-tetrachlorobutyl, iodopentyl, 2,3-dichloromethylhexyl, 3-trichloromethyl heptyl, chlorooctyl, bromooctyl and the various homologues and isomers of haloalkyl having 1 to 20 carbon atoms, aryl such as phenyl, biphenyl, naphthyl, and the like, haloaryl such as chlorophenyl, bromophenyl, 2,4-dichlorophenyl, 2,4,5-tribromophenyl, fluorophenyl and 2,4,6-trichlorophenyl and nitroaryl such as nitrophenyl, 2,4-dinitrophenyl, 2,5-dinitrophenyl, 2,4,6-trinitrophenyl and the like. When G represents $(R)X_n$, R is preferably alkyl having from 1 to 12 carbon atoms, X is Cl or Br and $n$ is an integer from 0 to 3. Representative A aryl for Formula I include the aryl listed for G above.

The mesomeric diphosphonium salts of this invention other than the chloride and bromide salts can be prepared from the primary products by metathesis, halogen addition and addition of metal halides in which the bond character is more covalent than ionic. Thus Z can be any anion, organic or inorganic. Representative Z in organic anions include by way of example halides ($Cl^-$, $F^-$, $Br^-$, and $I^-$); inorganic oxyanions such as sulfate, bisulfate, nitrate, phosphate, cyanate, thiocyanate, chlorate, perchlorate, sulfide, bromate, permanganate, phosphonate and the like; perhalide anions such as $I_3^-$, $Br_3^-$, $Cl_3^-$ and interhalogens such as $BrCl_2^-$, $IBr_2^-$, $ICl_2^-$, $ClBr_2^-$ and the like; complex haloanions of phosphorus, silicon and boron such as $PCl_6^-$, $PF_6^-$, $PCl_3F_3^-$, $PBr_6^-$ and the like; $SiF_2^-$, $BCl_4^-$ $BF_4^-$, $BCl_2F_2^-$, $BBr_2I_2$, $BI_4^-$ and the like; complex hydride anions including a Group III element such as $BH_4^-$, $AlH_4^-$, $GaH_4^-$ and the like; complex metallic halide anions of metals wherein the original metal to halide bond is more covalent than ionic such as Al, Sb, As, Be, Bi, Cd, Ce, Co, Cu, Ga, Au, In, Fe, La, Pb, Mn, Hg, Nb, Ni, Os, Re, Se, Ag, Ta, Tl, Sn, Zn and so forth.

The metal halides used in the present invention in the preparation of mesomeric phosphonium salts wherein the anion is a complex metallic halide anion are those wherein the character of the bond calculated using the electronegativity scale given at page 93 and discussed at pages 97–102 of Linus Pauling's "Nature of the Chemical Bond," 3d ed. (Cornell Univ. Press, 1960), is less than ½ ionic. Representative metal halides which add to the primary products of this invention to form complex metallic halide anions are the following:

| | | | |
|---|---|---|---|
| $AlBr_3$ | $BiI_3$ | $GaBr_3$ | $LaI_3$ |
| $AlCl_3$ | $CdBr_2$ | $GaCl_3$ | $PbBr_2$ |
| $AlF_3$ | $ReCl_6$ | $GaI_3$ | $KBr$ |
| $SbBr_3$ | $SeF_4$ | $AuBr$ | $SnCl_4$ |
| $SbCl_3$ | $AgBr$ | $AuBr_3$ | $TiCl_4$ |
| $SbI_3$ | $AgF$ | $AuCl$ | $TiBr_4$ |
| $SbCl_5$ | $AgI$ | $AuCl_3$ | $TiI_4$ |
| $SbI_3$ | $TaCl_5$ | $AuI_3$ | $BaCl_2$ |
| $SbI_5$ | $CdCl_2$ | $InBr_3$ | $PbCl_2$ |
| $AsBr_3$ | $CdF_2$ | $InCl_3$ | $PbI_2$ |
| $AsCl_3$ | $CdI_2$ | $ZnI_2$ | $MnBr_3$ |
| $NbCl_5$ | $CeCl_3$ | $NaCl$ | $MnCl_2$ |
| $NiBr_2$ | $CoBr_2$ | $NaI$ | $MnI_2$ |
| $NiCl_2$ | $CoCl_2$ | $NaBr$ | $HgBr_2$ |
| $NiI_2$ | $CoI_2$ | $KCl$ | $HgBrI$ |
| $OsF_6$ | $CuBr$ | $AsF_6$ | $HgCl_2$ |
| $ReCl_3$ | $CuBr_2$ | $InI_3$ | $HgF_2$ |
| $AsF_3$ | $CuCl$ | $FeBr_2$ | $HgI_2$ |
| $AsI_3$ | $CuCl_2$ | $FeBr_3$ | $NbBr_5$ |
| $BeBr_2$ | $TaBr_3$ | $FeCl_2$ | $ReCl_3$ |
| $BeCl_2$ | $TiCl_3$ | $FeCl_3$ | $TaCl_5$ |
| $BeF_2$ | $SnBr_2$ | $FeBr_3$ | $ZnCl_2$ |
| $BeI_2$ | $SnCl_2$ | $FeI_2$ | $KI$ |
| $BiBr_3$ | $ZnBr_2$ | $LaBr_3$ | $BaCl_2$ |
| $BiCl_3$ | $ZnCl_2$ | $LaCl_3$ | $SbCl_6$ |
| $BiBr_3$ | $CuI$ | | |

Representative Z organic anions include by way of example and not limitation organic oxyanions such as carboxylates comprising aliphatic and aromatic, mono- and polybasic, wherein the organic radical is hydrocarbon or hydrocarbon substituted by various radicals, such as acetates, benzoates, glutarates, laurates, oleates and the like; anions of organic acids and hydroxyl compounds such as toluenesulfonic acid, phenylphosphinic acid, benzeneboronic acid, phenol, 2,4,6-triphenylphenol and the like; and non-oxy organic anions of organic substituted metals and boron such as tetraphenylboronate, $$[Cr(SCN)_4(NH_3)_2]^-$$

and the like.

The preferred anions of the novel mesomeric phosphorus salt-forming cations of this invention are the acid anions, inorganic and organic, perhalogen anions and complex metallic halide anions.

The acid anions are usually reacted with the primary products of Formula II as the free acids, alkali metal or ammonium salts or lower alkyl esters in order to form additional mesomeric phosphonium salts by metathesis. In order to form the perhalogen salts and the complex metallic halide salts of the present invention the halogens and metallic halides are simply mixed with the primary products of Formula II in a suitable organic medium.

Metathesis, halogen addition, and addition of metallic halide can be carried out in the presence of an inert organic medium at widely varying temperatures depending on the specific reactants with temperatures from 20° C. to 100° C. being preferred. The inert media are generally selected so that the desired mesomeric phosphonium salt precipitates. Alternatively, the inert organic liquid can be selected so that the alkali metal or ammonium salt precipitates, leaving the desired mesomeric phosphonium salt in solution. Well-known methods of separation and purification can be used, e.g. filtration, decantation, fractional crystallization, extraction, chromatography, selective precipitation by addition of another diluent and the like.

The mesomeric phosphonium salts of this invention can be used as pest controlling agents, textile auxiliaries, means for soil amelioration, disinfectants (bactericides and fungicides), detergents, additives for petroleum products and means for flame-proofing polymers, ion exchangers and the like.

The following examples further illustrate the invention. Parts and percent are by weight unless otherwise indicated.

Example 1

This example describes the preparation of the hexaphenylcarbodiphosphorane used in the following examples.

A reaction vessel equipped with a stirrer, thermometer and condenser is purged with nitrogen and charged with 79.5 parts of triphenylphosphonium methylene-triphenylphosphorane bromide, 450 parts of diglyme and 5.8 parts of potassium metal. The reaction mixture is stirred under nitrogen at a temperature of about 150° C. for about 45 min. and then filtered to remove potassium bromide. After the filtrate has cooled to room temperature, it is filtered and the product washed twice with diglyme and ethyl ether and dried under vacuum to give 51 parts (74% yield) of hexaphenylcarbodiphosphorane, M.P. 198–201°, NMR spectrum (+4.3 p.p.m. in chlorobenzene).

*Analysis.*—Calcd. for $C_{37}H_{30}P_2$: C, 82.81; H, 5.64; P, 11.55. Found: C, 83.21; H, 5.70; P, 11.64.

Example 2

This example describes the preparation of

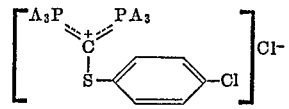

wherein each A represents phenyl.

To a solution of 5.4 parts of hexaphenylcarbodiphosphorane in 50 parts of benzene under stirring at about 30° C. is added 1.9 parts of p-chlorobenzenesulfenyl chloride. The reaction mixture is filtered, and the solid is washed with chlorobenzene and ethyl ether, extracted with hot diglyme, washed with ethyl ether and dried at 150°/ 0.1 mm. for 4 hours to give 7.1 parts (99%) of off-white solid, M.P. 317–320° (dec.).

*Analysis.*—Calcd. for $C_{43}H_{34}Cl_2P_2S$: C. 72.16; H, 4.79; Cl, 9.91; $Cl^-$, 4.95; P, 8.66; S, 4.48. Found: C, 71.66; H, 5.27; Cl, 9.79; $Cl^-$, 4.62; P, 8.67; S, 4.54

The infrared and NMR ($H^1$ and $P^{31}$) spectra for the off-white solid confirm the assigned structure.

Example 3

This example describes the preparation of

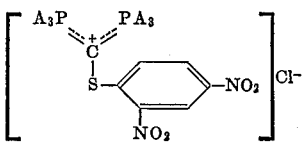

wherein each A represents phenyl.

A reaction vessel is charged with 5.4 parts of hexaphenylcarbodiphosphorane and 50 parts of chlorobenzene under nitrogen and then 2.3 parts of 2,4-dinitrobenzenesulfenyl chloride are added in small portions at room temperature with agitation. The reaction mixture is allowed to stand at room temperature for two days and is then filtered. Ethyl ether is added to the filtrate to precipitate the product salt. The product salt is separated by filtration, washed with ethyl ether and dried to give 6.9 parts of orange solid. A portion of this solid is dissolved in ethyl alcohol and precipitated by addition of ethyl ether and then recrystallized from benzene-ethanol to give orange crystals M.P. 287–288.5° (dec.).

Analysis.—Calcd. for $C_{43}H_{33}ClN_2O_4PS$: Cl−, 4.60; N, 3.63; P, 8.03; S, 4.16. Found: Cl−, 4.33; N, 3.57; P, 7.83; S, 4.17.

Example 4

This example describes the preparation of

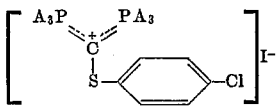

wherein each A represents phenyl.

A portion of the product of Example 2,

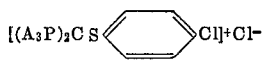

2 parts, is admixed with 9 parts of methyl iodide and allowed to stand for about 16 hours at room temperature. Ether is added to precipitate a light tan solid. The solid is recrystallized from methyl alcohol and then ethyl alcohol, extracted with hot diglyme, washed with ethyl ether and dried at reduced pressure to give 1.3 parts of a slightly yellow solid, M.P. 249.5–251°.

Analysis.—Calcd. for $C_{43}H_{34}ClIP_2A$: C, 63.98; H, 4.25; Cl, 4.39; I−, 15.72; P, 7.68; S, 3.97. Found: C, 63.91; H, 4.21; Cl, 4.59; I−, 15.68; P, 7.34; S, 3.88.

Addition of $I_2$ to the iodide salt in chlorobenzene yields the triiodide salt which is precipitated and purified by methods similar to those used for the iodide.

Example 5

This example describes the preparation of

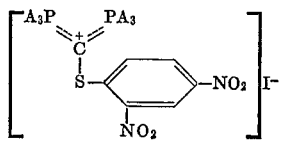

wherein each A represents a phenyl radical.

A portion of the product of Example 3,

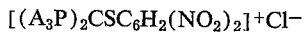

2.3 parts, and 1.0 part of potassium iodide are admixed with 8 parts of ethanol and heated to about 75° C. for one hour. The product is recovered by filtrating, washed with distilled water, warm ethyl alcohol and ether to give 2.1 parts of yellow solid M.P. 291–293.5°

Analysis.—Calcd. for $S_{43}H_{33}IN_2O_4P_2S$: C, 59.86; H, 3.86; I−, 14.71; N, 3.75; P, 7.18; S, 3.72. Found: C, 59.30; H, 4.03; I−, 15.08; N, 3.17; P, 6.97; S, 3.79.

Examples 6 to 36.—(Table 1)

Examples 6 to 36 describe the preparation of mesomeric phosphonium salts of the formula

wherein each A represents phenyl and G is as given in Table 1 by reaction of hexaphenylcarbodiphosphorane with the sulfenyl halides given in Table 1. Reaction conditions and purification procedures similar to those of Example 2 above are employed in Examples 6 to 36. Results and further details are given below.

TABLE 1

| Example | Sulfenyl halide, GSCl | Product G |
|---|---|---|
| 6 | Methylsulfenyl chloride | Methyl. |
| 7 | Ethylsulfenyl chloride | Ethyl. |
| 8 | n-Propylsulfenyl chloride | n-Propyl. |
| 9 | Isopropylsulfenyl chloride | Isopropyl. |
| 10 | n-Butylsulfenyl chloride | n-Butyl. |
| 11 | t-Butylsulfenyl chloride | t-Butyl. |
| 12 | Amylsulfenyl chloride | Amyl. |
| 13 | Octylsulfenyl chloride | Octyl. |
| 14 | Nonylsulfenyl chloride | Nonyl. |
| 15 | Decylsulfenyl chloride | Decyl. |
| 16 | Dodecylsulfenyl chloride | Dodecyl. |
| 17 | Hexadecylsulfenyl chloride | Hexadecyl. |
| 18 | Octadecylsulfenyl chloride | Octadecyl. |
| 19 | Chloromethylsulfenyl chloride | Chloromethyl. |
| 20 | Dichloromethylsulfenyl chloride | Dichloromethyl. |
| 21 | Bromomethylsulfenyl chloride | Bromomethyl. |
| 22 | Dibromomethylsulfenyl chloride | Dibromomethyl. |
| 23 | 2-chloroethylsulfenyl chloride | 2-chloroethyl. |
| 24 | 1-chloroisobutylsulfenyl chloride | 1-chloroisobutyl. |
| 25 | Trifluoromethylsulfenyl chloride | Trifluoromethyl. |
| 26 | 2-bromoethylsulfenyl chloride | 2-bromoethyl. |
| 27 | 2-chlorooctylsulfenyl chloride | 2-chlorooctyl. |
| 28 | Naphthylsulfenyl chloride | Naphthyl. |
| 29 | Biphenylsulfenyl chloride | Biphenyl. |
| 30 | Phenanthrenesulfenyl chloride | Phenanthrene. |
| 31 | p-Chlorophenylsulfenyl chloride | p-Chlorophenyl. |
| 32 | 2,4-dichlorophenylsulfenyl chloride | 2,4-dichlorophenyl. |
| 33 | 2,4,6-dichlorophenylsulfenyl chloride | 2,4,6-trichlorophenyl. |
| 34 | o-Nitrophenylsulfenyl chloride | Nitrophenyl. |
| 35 | 2,4-dinitrophenylsulfenyl chloride | 2,4-dinitrophenyl. |
| 36 | Trichloromethylsulfenyl chloride | Trichloromethyl. |

Examples 37 to 43.—(Table 2)

Examples 37 to 43 describe the preparation of mesomeric phosphonium salts of the formula

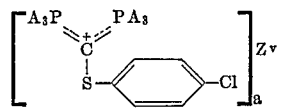

wherein each A represents phenyl and Z is as given in Table 2 by reaction of mesomeric phosphonium salts of the formula

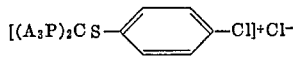

with various salts, halogens and metallic halides. Reaction conditions and purification procedures similar to those of Example 4 are employed in Examples 37 to 43.

TABLE 2

| Example: | Salt | Metallic Halide | Halogen | Z |
|---|---|---|---|---|
| 37 | Na$_2$SO$_4$ | | | SO$_4^-$ |
| 38 | KBF$_4$ | | | BF$_4^-$ |
| 39 | NaBA$_4$ [1] | | | BA$_4^-$ |
| 40 | Na[Cr(SCN)$_4$(NH$_3$)$_2$] | | | [Cr(SCN)$_4$(NH$_3$)$_2$]$^-$ |
| 41 | | HgCl$_2$ | | HgCl$_3^-$ |
| 42 | | AlCl$_3$ | | AlCl$_4^-$ |
| 43 | | | I$_2$ | I$_2$Cl$^-$ |

[1] Wherein each A is phenyl.

Having thus described my invention, what I desire to claim and secure by Letters Patent is:

1. Compounds as represented by the formula

[(PA$_3$)$_2$CSG]$_a$Z$^v$ wherein each A is aryl, G is an organic radical having from 1 to 20 carbon atoms selected from the group consisting of (R)X$_n$, wherein R is alkyl, X is halogen and $n$ is an integer from 0 to 5 aryl, and

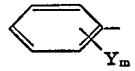

wherein Y is selected from the group consisting of halogen and NO$_2$ and $m$ is an integer from 1 to 3, Z is an anion, $v$ is the actual valence of the anion Z and is an integer from 1 to 2 and $a$ is an integer equal to $v$.

2. Compounds of claim 1 wherein Z is selected from the group consisting of Cl and Br.
3. Compounds of claim 1 wherein Z is an anion selected from the group consisting of acid anions, perhalogen anions and complex metallic halide anions.
4. Compounds of claim 1 wherein G is alkyl.
5. Compounds of claim 1 wherein G is aryl.
6. Compounds of claim 1 wherein G is chlorophenyl.
7. Compounds of claim 1 wherein G is 2,4-dinitrophenyl.
8. Compounds of claim 1 wherein G is methyl.
9. Compounds of claim 1 wherein G is ethyl.
10. Compounds of claim 1 wherein G is phenyl.
11. Compounds of claim 1 wherein G is propyl.
12. Compounds of claim 1 wherein A is phenyl, G is p-chlorophenyl and Z is I.
13. Compounds of claim 1 wherein A is phenyl, G is 2,4-dinitrophenyl and Z is Cl.
14. Process for the preparation of compounds as represented by the formula

[(PA$_3$)$_2$CSG]$^+$X$_1^-$ wherein each A is aryl, G is an organic radical having from 1 to 20 carbon atoms selected from the group consisting of (R)X$_n$, wherein R is alkyl, X is halogen and $n$ is an integer from 0 to 5 aryl, and

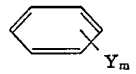

wherein Y is selected from the group consisting of halogen and NO$_2$ and $m$ is an integer from 1 to 3, and X$_1$ is selected from the group consisting of Cl and Br which comprises reacting hexaphenylcarbodiphosphorane with a sulfenyl halide of the formula GSX$_1$, wherein G and X$_1$ are as defined above.

15. The process of claim 14 wherein G is alkyl.
16. The process of claim 14 wherein G is aryl.
17. The process of claim 14 wherein G is 2,4-dinitrophenyl.
18. The process of claim 14 wherein G is m-chlorophenyl.
19. The process of claim 14 wherein G is methyl.

References Cited

UNITED STATES PATENTS

| 3,262,971 | 7/1966 | Matthews | 260—606.5 X |
| 3,330,868 | 7/1967 | Grisley | 260—606.5 |
| 3,374,256 | 3/1968 | Driscoll et al. | 260—606.5 X |

TOBIAS E. LEVOW, Primary Examiner.

W. F. W. BELLAMY, Assistant Examiner.

U.S. Cl. X.R.

260—414, 429, 429.2, 429.5, 429.7 430, 433, 437, 438.1, 439, 440, 446, 447, 448; 424—184, 185, 204

PO-1050
(5/69)

UNITED STATES PATENT OFFICE
CERTIFICATE OF CORRECTION

Patent No. 3,446,852     Dated May 27, 1969

Inventor(s) Gail H. Birum

It is certified that error appears in the above-identified patent and that said Letters Patent are hereby corrected as shown below:

Column 6, line 24, the formula "$[(A_3P)_2CSC_6H_2(NO_2)_2]^+Cl^-$" should read -- $[(A_3P)_2CSC_6H_4(NO_2)_2]^+Cl^-$ --.

Column 6, line 30, the formula "$S_{43}H_{33}IN_2O_4P_2S$:" should read -- $C_{43}H_{33}IN_2O_4P_2S$: --.

Column 7, line 26, last column of Table 2, the formula "$SO_4^-$" should read -- $SO_4^=$ --.

SIGNED AND
SEALED

JUN 9 1970

(SEAL)
Attest:

Edward M. Fletcher, Jr.

Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,446,852            Dated May 27, 1969

Inventor(s)     Gail H. Birum

It is certified that error appears in the above-identified patent and that said Letters Patent are hereby corrected as shown below:

Column 6, line 24, the formula "$[(A_3P)_2CSC_6H_2(NO_2)_2]^+Cl^-$" should read -- $[(A_3P)_2CSC_6H_4(NO_2)_2]^+Cl^-$ --.

Column 6, line 30, the formula "$S_{43}H_{33}IN_2O_4P_2S$:" should read -- $C_{43}H_{33}IN_2O_4P_2S$: --.

Column 7, line 26, last column of Table 2, the formula "$So_4^-$" should read -- $SO_4^=$ --.

SIGNED AND
SEALED

JUN 9 1970

(SEAL)
Attest:

Edward M. Fletcher, Jr.
Attesting Officer

WILLIAM E. SCHUYLER, JR.
Commissioner of Patents